United States Patent [19]

Neiheisel

[11] Patent Number: 4,468,551
[45] Date of Patent: Aug. 28, 1984

[54] LASER TREATMENT OF ELECTRICAL STEEL AND OPTICAL SCANNING ASSEMBLY THEREFOR

[75] Inventor: Gary L. Neiheisel, Cincinnati, Ohio

[73] Assignee: Armco Inc., Middletown, Ohio

[21] Appl. No.: 403,790

[22] Filed: Jul. 30, 1982

[51] Int. Cl.³ ............................................. B23K 27/00
[52] U.S. Cl. ......................... 219/121 L; 219/121 LR; 219/121 LW
[58] Field of Search .... 219/121 L, 121 LW, 121 LR, 219/121 LP, 121 LQ, 121 LM; 148/111, 112, 121

[56] References Cited

U.S. PATENT DOCUMENTS

| | | | |
|---|---|---|---|
| 3,181,170 | 4/1965 | Akin | 346/108 |
| 3,633,126 | 1/1972 | Marth | 330/4.3 |
| 4,001,840 | 1/1977 | Becker et al. | 346/76 L |
| 4,015,100 | 3/1977 | Gnanamuthu et al. | 219/121 LW X |
| 4,063,063 | 12/1977 | Funck et al. | 219/121 LM |
| 4,223,346 | 9/1980 | Neiheisel et al. | 250/572 X |
| 4,293,350 | 10/1981 | Ichiyama et al. | 148/111 |
| 4,315,130 | 2/1982 | Inabaki et al. | 219/121 L |
| 4,321,551 | 3/1982 | Bleil et al. | 372/31 X |
| 4,322,601 | 3/1982 | Serlin | 219/121 LE |
| 4,323,755 | 4/1982 | Nieremberg | 219/121 LR X |
| 4,333,173 | 6/1982 | Yonezawa et al. | 250/201 X |
| 4,336,439 | 6/1982 | Sasnatt et al. | 219/121 LH |

OTHER PUBLICATIONS

C. D. Elzinga, IBM Technical Disclosure Bulletin, "Scanner and Data Compaction System", vol. 22, No. 6, Nov., 1979, pp. 2463, 2464.
W. B. Jones, et al., "ND:Slab Face-Pumped Lasers", General Electric Company, pp. 515-519.
IBM Technical Disclosure Bulletin, vol. 14, No. 9, 02/72, pp. 2641-2642.
IBM Technical Disclosure Bulletin, vol. 20, No. 11B, 04/78, pp. 4939-4940.

Primary Examiner—C. L. Albritton
Attorney, Agent, or Firm—Frost & Jacobs

[57] ABSTRACT

Apparatus for scanning a continuous wave Nd:YAG laser beam across a moving strip of grain oriented silicon steel having an insulative coating to subdivide the magnetic domains of the strip to improve core loss without damage to the insulative coating. The laser beam is scanned by a multiple-faced rotating mirror and focused onto the strip surface by a flat field lens and cylindrical lens to produce a scan line of narrow width having the required irradiation energy, dwell time and line spacing at the surface of the moving strip.

20 Claims, 4 Drawing Figures

LASER TREATMENT OF ELECTRICAL STEEL AND OPTICAL SCANNING ASSEMBLY THEREFOR

TECHNICAL FIELD

The invention relates to the laser treatment of electrical steels having an insulative coating thereon, e.g., a mill glass, a secondary coating, or both, and more particularly to the laser treatment of such electrical steels to improve core loss without any damage to the insulative coating. The invention also relates to means for scanning the laser beam across the steel.

BACKGROUND ART

The teachings of the present invention can be practiced on any magnetic material having domains of such size that refinement thereof would produce significant core loss improvement, such as amorphous materials, cube-on-face oriented electrical steel (designated (100) [001] by Miller's Indices) and cube-on-edge oriented silicon steels. For purposes of an exemplary showing the invention will be described in its application to improvements in the manufacture of cube-on-edge oriented electrical steel. In cube-on-edge oriented electrical steel, the body-centered cubes making up the grains or crystals are oriented in a cube-on-edge position, designated (110) [001] in accordance with Miller's indices.

Cube-on-edge oriented silicon steels are well known in the art and are commonly used in the manufacture of cores for transformers and the like. The teachings of the present invention will be described in terms of its application to cube-on-edge oriented silicon steels. It will be understood by one skilled in the art, however, that the teachings of the present invention are also applicable to magnetic materials wherein the domain size is suitably large that treatment in accordance with the present invention would be beneficial.

In recent years prior art workers have devised various routings for the manufacture of cube-on-edge oriented silicon steel which have resulted in markedly improved magnetic characteristics. As a consequence, such electrical steels are now considered to fall into two basic categories.

The first category is generally referred to as regular grain oriented silicon steel and is made by routings which normally produce a permeability at 796 A/m of less than 1870 with a core loss at 1.7 T and 60 Hz of greater than 0.700 W/lb when the strip thickness is about 0.295 mm.

The second category is generally referred to as high permeability grain oriented silicon steel and is made by routings which normally produce a permeability at 796 A/m of greater than 1870 with a core loss less than 0.700 W/lb (at 1.7 T and 60 Hz) when the strip thickness is about 0.295 mm.

U.S. Pat. No. 3,764,406 is typical of those which set forth routings for regular grain oriented silicon steel. For regular grain oriented silicon steel a typical melt composition by weight percent may be stated as follows:

C: less than 0.085%
Si: 2%–4%
S and/or Se: 0.015%–0.07%
Mn: 0.02%–0.2%

The balance being iron and those impurities incident to the mode of manufacture.

In a typical but non-limiting routing, the melt may be cast into ingots and reduced to slabs or continuously cast in slab form. The ingots or slabs may be reheated to a temperature of about 1400° C. and hot rolled to hot band thickness. The hot rolling step may be accomplished without reheating if the ingot or slab is at the required rolling temperature. The hot band is annealed at a temperature of about 980° C. and pickled. Thereafter, the silicon steel may be cold rolled in one or more stages to final gauge and decarburized at a temperature of about 815° C., for a time of about 3 minutes in a wet hydrogen atmosphere with a dew point of about 60° C. The decarburized silicon steel is thereafter provided with an annealing separator, such as a coating of magnesia, and is subjected to a final high temperature box anneal in an atmosphere such as dry hydrogen at a temperature of about 1200° C. to achieve the desired final orientation and magnetic characteristics.

U.S. Pat. Nos. 3,287,183; 3,636,579; 3,873,381 and 3,932,234 are typical of those teaching routings for high-permeability grain oriented silicon steel. A non-limiting, exemplary melt composition for such a silicon steel may be set forth as follows in weight percent:

Si: 2%–4%
C: less than 0.085%
Al (acid-soluble): 0.01%–0.065%
N: 0.003%–0.010%
Mn: 0.03%–0.2%
S: 0.015%–0.07%

The above list includes only the primary constituents; the melt may also contain minor amounts of copper, phosphorus, oxygen and those impurities incident to the mode of manufacture.

In an exemplary (but non-limiting) routing for such high-permeability grain oriented silicon steel the melt may be cast into ingots and rolled into slabs or continuously cast in slab form. The slab is reheated (if necessary) to a temperature of about 1400° C. and is hot rolled to hot band thickness. After hot rolling, the steel band is continuously annealed at a temperature of from about 850° C. to about 1200° C. for from about 30 seconds to about 60 minutes in an atmosphere of combusted gas, nitrogen, air or inert gas. The strip is thereafter subjected to a slow cooling to a temperature of from about 850° C. to about 980° C., followed by quenching to ambient temperature. After descaling and pickling, the steel is cold rolled in one or more stages to final gauge, the final cold reduction being from about 65% to about 95%. Thereafter, the steel is continuously decarburized in wet hydrogen at a temperature of about 830° C. for about 3 minutes at a dew point of about 60° C. The decarburized silicon steel is provided with an annealing separator such as magnesia and is subjected to a final box anneal in an atmosphere of hydrogen at a temperature of about 1200° C.

With respect to both types of grain oriented electrical steel, it is common practice, after the final high temperature anneal during which the desired (110) [001] texture is developed, to provide an insulative coating having a high dielectric strength on the grain oriented silicon steel (in lieu of or in addition to a mill glass) followed by a continuous anneal at a temperature of about 815° C. for about three minutes in order to thermally flatten the steel strip and cure the insulative coating. Exemplary applied insulative coatings are taught in U.S. Pat. Nos. 3,948,786; 3,996,073; and 3,856,568.

The primary object of the present invention is to improve (i.e. reduce) the core loss of grain oriented silicon steel. Prior art workers have long addressed themselves to this problem and have devised both metallurgical and non-metallurgical means for reducing core loss. The metallurgical means include better orientation, thinner final thickness, higher volume resistivity and smaller secondary grain sizes. However, these metallurgical variables must be kept within prescribed limits to attain the optimum core loss in the finished grain oriented electrical steel. Maintaining this metallurgical balance has inhibited the development of materials with core losses closer to the theoretical limits. This has led a number of prior art workers to seek various non-metallurgical means to improve core loss after the metallurgical processing is substantially complete.

One non-metallugical approach is to apply a high-stress secondary coating onto the finished grain oriented electrical steel, as taught in U.S. Pat. No. 3,996,073. Such coatings place the grain oriented electrical steel strip in tension, which causes a decrease in the width of the 180° magnetic domains and the reduction of the number of supplementary domains. Since narrow 180° domains and few supplementary domains are desired in order to decrease the core loss of grain oriented electrical steels, such high-stress coatings are beneficial. However, the amount of tensile force that can be applied by these means is limited.

Another non-metallurgical approach is that of inducing controlled defects which is, in a sense, the creation of a substructure to limit the width of the 180° domains in the finished grain oriented electrical steel. A basic technique is taught in U.S. Pat. No. 3,647,575 where the deformation of the surface of a grain oriented electrical steel is employed to induce defects to limit the length of the 180° domains, resulting in a reduction in the width of the 180° domains, thereby reducing the core loss. This is accomplished by providing narrowly spaced shallow grooves or scratches at or nearly transverse to the rolling direction and on opposite sides of the sheet. A grain oriented sheet treated according to U.S. Pat. No. 3,647,575 will have the insulative coating damaged and an uneven surface. These will result in increased interlaminar losses and decreased space factor, respectively, in a transformer fabricated from a steel so treated.

There have been numerous subsequent papers and patents which teach various methods of inducing controlled defects. Of particular interest are those techniques which limit domain size by localized irradition such as with a laser beam or the like, which, in part, overcomes the detrimental effects of the scratching process taught in U.S. Pat. No. 3,647,575.

USSR Pat. No. 653302 teaches that a grain oriented electrical steel can be treated with a laser beam to induce a substructure to regulate the domain wall spacing, thereby improving the core loss. According to USSR Pat. No. 653302, the surface of a grain oriented electrical steel sheet is irradiated at or nearly transverse to the rolling direction after the high temperature final anneal. In the irradiated regions, the sheet is rapidly heated from about 800° C. to about 1200° C. After the laser treatment, the grain oriented electrical steel sheet must be coated and annealed at a temperature of from about 700° C. to about 1100° C. A conventional grain oriented electrical steel sheet treated according to the teachings of USSR Pat. No. 653302 can have the core loss improved 10% or more; however, the permeability often is decreased and the exciting power increased, particularly when very thin final thicknesses of 0.30 mm or less are employed, which limits the commercial applicability of this technique.

U.S. Pat. No. 4,293,350 teaches another method of laser treatment for grain oriented electrical steel. According to U.S. Pat. No. 4,293,350, the surface of a grain oriented electrical steel sheet is briefly irradiated with a pulsing laser following the high temperature final anneal. The laser is so directed as to cross the surface of the sheet at or nearly transverse to the rolling direction. Irradiated regions are formed on the surface of the grain oriented silicon steel sheet within which a slight but significant substructure is induced to limit the width of the domains, thereby improving the core loss. Laser treatments done within the limits of U.S. Pat. No. 4,293,350 can improve the core loss of conventional grain oriented electrical steels by about 5% while high-permeability grain oriented electrical steels are improved by 10% or more without significantly degrading the permeability or exciting power of the treated sheet. The commercial applicability of an electrical steel treated according to these techniques is limited to stacked core transformer designs where the transformer core is not annealed to relieve the stresses resulting from fabrication. The slight laser-induced dislocation substructure will be removed upon annealing above from about 500° C. to about 600° C., while typical stress relief annealing is done at about 800° C. An additional limitation of the technique taught in U.S. Pat. No. 4,293,350 is that the insulative coating, e.g., mill glass, secondary coating, or both, is damaged by treatment with a pulsed laser. Very high interlaminar resistivity and coating integrity is desired for grain oriented electrical steels used in stacked core designs.

European Pat. No. 33878 teaches a method of laser treating according to U.S. Pat. No. 4,293,350, followed by a coating operation and heating the laser treated and coated sheet to about 500° C. to cure the coating; however, this technique necessitates additional processing steps and expense.

The present invention is based upon the discovery that grain oriented electrical steel having an insulative coating comprising a mill glass, an applied coating, or both, can be treated with a continuous wave laser to significantly reduce core loss through domain subdivision and refinement, without injury to the insulative coating, thereby resulting in a steel having laser refined magnetic domains with an uninterrupted coating.

DISCLOSURE OF THE INVENTION

According to the invention there is provided a laser treatment for both conventional and high-permeability grain oriented electrical steels, having an insulative coating in the form of a mill glass, an applied insulative coating, or both, prior to the laser treatment.

The laser treatment introduces narrow zones with high dislocation density at or nearly 90° to the rolling direction. The stress fields associated with these zones serve to refine the spacing of the domain walls, resulting in a marked reduction of the core loss of the grain oriented electrical steel.

During the laser treatment, the grain oriented silicon steel may be maintained under tension applied in (or nearly parallel to) the rolling direction. The application of tensile forces to the electrical steel enables the production of material free from bowing, surface impressions or indentations, waviness, or other physical distortions of the strip flatness, resulting from the laser treatment. Such distortions cannot be tolerated if the maximum improvement in transformer core loss is to be attained. Additionally, use of tension while lasing minimizes any degradation of the magnetostrictive properites of the treated sheet. For purposes of an exemplary implementation, the present invention is described and illustrated using an optical assembly for mechanically scanning a continuous wave Nd:YAG laser beam across the width of a moving steel strip to accomplish the type of steel treating process just described.

The relatively narrow beam from the high powered Nd:YAG laser is first directed through an up collimator to produce a broad collimated beam with reduced divergence. The direction of the collimated beam may be altered slightly as required through directional mirrors, thereby permitting the laser transmitter to be located at various positions adjacent the moving steel strip line.

The directed collimated laser beam impinges on a rapidly rotating polygonal faced mirror positioned to scan the laser beam transversely across the width of the moving steel strip. The orientation of the rotating mirror, the width of its reflecting faces and the speed of rotation are selected to cause the scan line to be substantially perpendicular to the direction of travel of the strip and so that adjacent scan lines will have the proper spacing, while maintaining the desired dwell time of the spot as it traverses the strip in order to produce the maximum domain refinement without damage to the insulative coating.

The scanned beam is passed through a large flat field lens which operates to focus the spot over a wide scan line. The resulting laser spot focused on the strip surface in this method will normally be circular in shape. However, greater operating flexibility is obtained by use of an elliptical-shaped spot. This may be accomplished by passing the focused beam from the flat field lens through a large cylindrical lens having its longitudinal axis oriented transversely to the directon of strip travel which operates to produce an elliptical-shaped beam of very narrow width. In either case, the focused spot develops the required irradiation energy and dwell time to effectively cause refinement of the magnetic domains, thereby improving the core loss as described hereinabove, while avoiding damage to the insulative coating carried on the steel strip surface.

Further features of the invention will become apparent from the detailed description which follows.

DETAILED DESCRIPTION OF THE INVENTION

As is well known in the art, a laser produces monochromatic electromagnetic radiation which may have a wave length ranging from far infrared to ultraviolet. A laser is characterized by a well-defined beam that can be directed and controlled with precision so that in laser material treatment applications its energy is absorbed at or near the surface of a material, with the amount of absorption varying according to the characteristics and finish of the material irradiated. During absorption, the radiant energy is converted into localized heat. Since the energy of the laser beam can be precisely regulated, the temperature of a targeted material can be precisely regulated. Many types of lasers have been developed.

One method of classifying lasers is in accordance with the material used for the lasing medium. The lasing medium will determine the wave length characteristic of the output beam. The work upon which the present application is based was done using a Neodymium YAG (Nd: YAG) laser in which there is a cylindrical rod of single yttrium-aluminum-garnet (YAG) crystal doped with 0.5-3% Neodymium ions. The output wave length, dictated by neodymium, is 1.06 $\mu$m which lies in the near infrared part of the spectrum. This wave length is attractive because it will pass through a mill glass or an applied insulative coating on the steel strip with only minimal absorption.

Another method of classification of lasers is based upon the manner in which the laser energy is delivered, i.e., continuously, in a single pulse, or in a series of pulses.

With respect to a pulsed laser, the energy or radiation is delivered in discrete bundles of controlled duration and frequency or repetition rate. The important parameters for a pulsed laser are: average power output, pulse repetition rate (frequency), time duration of a single pulse, the beam diameter at the surface being irradiated, and the rate of beam travel across this surface (scan rate). Pulse duration affects the depth of penetration of the energy into the material irradiated. In addition, the energy delivered to the surface of the material can be controlled by the beam diameter and the scan rate. Two types of pulsed lasers commonly encountered are the conventional pulsed laser and the Q-switched laser. The Q-switched laser delivers pulses of much shorter duration (0.0001 msec) and at greater pulse repetition rates (1,000-40,000 pulses per second are common) than does the conventional pulsed laser (pulse durations of 0.65-10 msec and pulse repetition rates of 100-400 pulses per second are common), resulting in a higher instantaneous peak power (where "power" is the energy delivered per unit time).

Another commonly used type of laser is the so-called continuous wave (CW) laser, the beam output of which is constant and is expressed in terms of power (watts). The amount of energy delivered to a surface from a continuous wave laser is controlled by: the average power output, the beam diameter at the surface being irradiated, and the scan rate.

When all three types of lasers (i.e., continuous wave, conventional pulsed, and Q-switched lasers) were used in the practice of the present invention, all three being of the Nd:YAG type and having a wave length of 1.06 $\mu$m, it was found that all three types of lasers produced domain refinement and consequent core loss reduction in regular and high-permeability grain oriented silicon steel provided with a mill glass or an insulative coating. However, the Q-switched laser was not found to be attractive for the laser treatment of coated silicon steel because the very short duration and resultant high instantaneous peak power of the pulses of energy destroyed the coating.

On the other hand, excellent results have been achieved utilizing a conventional pulsed laser. While such a laser may be characterized by higher pulse energies, the pulse durations are much longer (e.g., 0.65 msec-10 msec) so that the peak power is much lower. As a result, an insulative coating in the form of a mill glass, an applied coating, or both can be unaffected by treating with a conventional pulsed laser since the very high peak powers encountered with a Q-switched laser are avoided.

However, the conventional pulsed laser was not found to be attractive for laser treatment of grain oriented electrical steel because the inherently very low pulse repetition rates preclude its application in high speed production lines. Additionally, the use of the conventional pulsed laser requires that average energy densities at the surface be increased to obtain the desired domain refinement as compared with the Q-switched pulsed laser. The use of these higher surface energy densities may cause an additional problem of physical distortion of the sheet flatness. These distortions are characterized by bowing of the sheet and/or the creation of linear surface impressions. Such impressions are harmful to the core loss of the pulsed laser-treated strip and also to the stacking factor of transformers made of pulsed laser-treated sheet.

In the use of a conventional pulsed laser, the "spot" pattern on the surface of the grain oriented silicon steel must be selected to achieve the best core loss reduction and to allow complete coverage of the material at production line speeds. This will, of course, depend upon the width of the silicon steel strip being treated and the pulse repetition rate of the laser being used. It has been found that the surface energy density must be increased as the spot separation increases. Thus, for a given strip width and line speed, it is necessary to properly control the pulse spot overlap or spacing and the energy density of the laser beam at the surface of the strip, these factors affecting the ability to scan wide widths rapidly and to produce consistent core loss reductions.

Excellent results have been achieved in the practice of the present invention with a continuous wave laser. There are two distinct differences between a continuous wave laser and a pulsed laser. First, the continuous wave laser emits radiation constantly without peaks of high instantaneous power, characteristic of pulsed lasers. Secondly, the scanning of a continuous wave laser gives rise to an "effective dwell time" analogous to the pulse duration for pulsed lasers, except that this "effective dwell time" changes as a function of the scan rate and beam diameter at the irradiated surface. The effective dwell time or beam residence time is the time the focused spot spends at any point on the material surface. Thus, the energy delivered to a point on the material can be obtained from this time and the average power.

Figure 1:
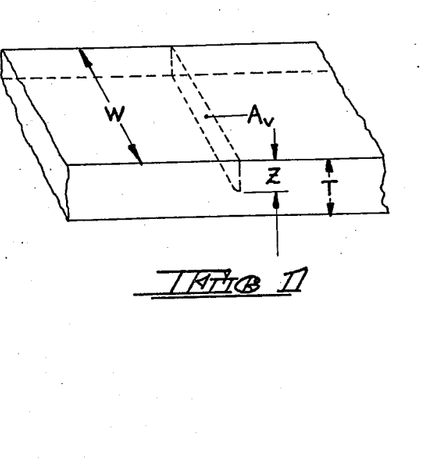
FIG. 1 is a diagrammatic view of a steel strip illustrating the geometrical relationship pertinent to the present invention.

The geometry associated with a relatively thin steel strip of indefinite length to be treated by the laser treating process described hereinabove is illustrated diagrammatically in FIG. 1. The width of the strip is designated W while the nominal thickness of the strip is indicated as T. When a laser beam is scanned transversely across the width W of the strip, heat penetration will occur in the strip to a depth Z. The energy associated with the laser beam and occuring within the vertical area $A_v$ may then be designated as $E/A_v$, or $E/WZ$ by mere substitution of the actual parameters for the width of the strip and the depth of penetration.

It is well known that the energy value E can be expressed as the product of the power P produced by the laser beam and the scan time $t_{scan}$ required to move the beam across the width W of the strip. Similarly, the depth of penetration Z can be shown to be approximately equal to where $[4\kappa \Delta]^{\frac{1}{2}}$ where $\kappa$ is the thermal diffusivity and $\Delta t$ is the dwell time or residence time of the scanned spot at a particular location. As is well known, the thermal diffusivity is equal to the thermal conductivity divided by the product of density and specific heat capacity, and for silicon steel is equal to approximately 0.057 cm$^2$/sec. Combining the aforementioned values, the energy per unit vertical area $E/A_v$ can be expressed as:

$$\frac{P\, t_{scan}}{2W\sqrt{\kappa\, \Delta t}}$$

This expression can be expanded for particular spot shapes as will be described in more detail hereinafter.

Another quantity of interest in connection with the present invention is the power P produced by the laser beam per unit surface area A, P/A, as measured at the surface of the material being treated. It has been found that a minimum value of $E/A_v$ is necessary to produce the desired domain refinement in the material under treatment, while the maximum value of P/A must be limited to prevent damage to the insulative coating.

In a typical application of the present invention to a moving steel strip routing, the scan time $t_{scan}$ will be adjusted so that the beam traverses the entire strip width W and produces the required spacing between adjacent scan lines. Since the present invention contemplates the use of a continuous wave laser, the required scan time also determines the value of the dwell time $\Delta t$. Consequently, since the thermal diffusivity $\kappa$ will be more or less constant for a given material, the magnitude of $E/A_v$ can be controlled through proper selection of the laser beam power P. However, the dwell time $\Delta t$ may also be regulated by controlling the repetition rate of the laser beam as it is scanned across the strip, e.g. by use of a pulsed laser.

Very short pulse widths on the order of 0.1 $\mu$sec. (e.g. as obtainable from a Q-switched laser) will produce coating damage when the surface energy density is sufficient to cause domain refinement. Longer dwell times allow the energy to diffuse further into the material affecting formation of the domain walls. However, too long a dwell time can cause physical distortions characterized by bowing of the strip and/or the development of linear surface impressions on the strip. Effective dwell times as short as 0.003 msec have been used with success.

A high powered continuous wave Nd:YAG laser, capable of power outputs of 20W to 600W can be rapidly scanned to produce marked reductions in core loss in both regular grain oriented and high-permeability grain oriented electrical steels having a mill glass, an applied insulative coating, or both. Such a laser is particularly desirable for production applications because of its simpler design and control parameters, as compared to either a conventional pulsed or Q-switched Nd:YAG laser. More importantly, the insulative mill glass or applied coatings are unaffected by treatment with a continuous wave laser in association with the present invention and such treatment can be performed without the expense of recoating the strip.

It has been found that laser treatments of the type contemplated by the present invention can result in distortions of the strip flatness in the form of bowing or the development of linear surface impressions. It has been discovered that these physical distortions of the strip flatness, which are very harmful to core loss reduction, can be avoided if, during the laser treatment, tension is applied to the grain oriented electrical steel strip in or nearly parallel to the rolling direction of the strip. The uniaxial tensile stress is, of course, limited by the elastic yield strength of the grain oriented electrical steel, approximately 324 MPa. However, uniaxial stresses of from about 3.5 MPa to about 70 MPa have been employed with success. Preferably, the uniaxial stresses should be from about 10.0 MPa to about 35 MPa. The tensile force or forces can be induced by uniaxial loading, biaxial loading or radial loading during the laser treatment. Furthermore use of tension while lasing results in minimizing any degredation of the magnetostrictive properties of the treated sheet.

In the practice of the present invention it has been determined that the focused spot diameter should be as small as possible. Excellent work has been achieved with laser beam spot diameters of from about 0.025 to about 1.5 mm. Excellent results have been achieved with effective dwell times of from 0.003 msec to 0.65 msec. Line spacing on the surface of the coated silicon steel should be equal to or greater than 2 mm. The line spacing, as defined in U.S. Pat. No. 4,293,350, constitutes the distance between two adjacent lines plus the thickness of a line. An important factor affecting line spacing is the demand for high production line speeds. Finally, energy density of the laser beam per unit vertical surface area ($E/A_v$) should be as large as possible to maximize domain refinement without damaging the insulative coating.

High-permeability, 0.270 mm thick grain oriented silicon steel samples, having an aluminum-magnesium-phosphate coating of the type taught in U.S. Pat. No. 3,996,073 and U.S. Pat. No. 3,948,786, were tested for adherence, Franklin resistivity and dielectric breakdown characteristics to see what effect the laser treatments of the present invention had upon the insulative coating. The Franklin resistivity test results showed that the laser treatment did not have an effect on the insulative value of the insulative coating on either the top (irradiated) surface of the samples, or on the bottom surface. All samples demonstrated excellent resistivity.

The breakdown strength of the insulative coating on lased samples was tested by applying an increasing voltage across the insulative coating until the coating failed and conducted appreciable current. The maximum voltage that a coating withstands without breaking down constitutes the breakdown strength, which is related to dielectric strength. Lasing did not harm the breakdown strength of the insulated coatings at the laser power levels, scan rates and dwell times used in the practice of the present invention.

Laser-treated samples were tested in a three-quarter inch bend tester to evaluate the effect of lasing on the insulating coating adherence. The results indicated that lasing did not affect adherence. The core loss improvements achieved in the practice of the present invention are stable at transformer operating temperatures and the laser treatments are not harmful to a mill glass, an applied coating, or both.

Figure 2:
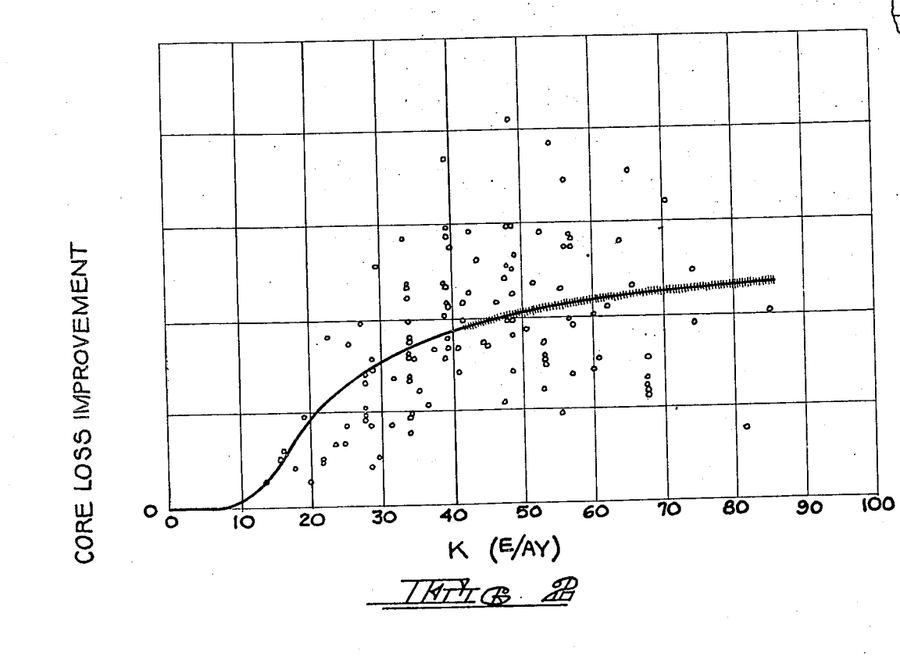
FIG. 2 is a graphical representation of core loss improvement using a circular laser spot geometry in connection with the present invention.

FIG. 2 illustrates graphically the typical core loss improvement obtained using the laser treatment process of the present invention for a high permeability grain oriented silicon steel provided with an aluminum-magnesium-phosphate insulative coating of the type taught in U.S. Pat. No. 3,996,073. The results plotted are for a treatment process using a circular laser spot. The horizontal axis is calibrated in units of laser energy per unit vertical area ($E/A_v$) multiplied by a constant K equal to where $2\sqrt{\kappa}$, where $\kappa$ is the thermal diffusivity. Thus for silicon steel, K is about 0.48.

As can be seen, significant improvements in core loss can be obtained with increasing values of energy per unit vertical area. In the typical example illustrated, the variation or scatter in data points results from normal statistical non-uniform material parameters such as permeability, grain size, grain orientation, and coating variations.

However, it has been found that the value of $E/A_v$ cannot merely be increased arbitrary to produce further domain refinement resulting in increased core loss improvement. Rather, a point is reached at which coating damage occurs. Further increases in the value of $E/A_v$, while possibly improving core loss, result in increasing insulative coating degradation, until at higher values of $E/A_v$, the coating is eventually entirely stripped from the surface of the steel strip.

Figure 3:
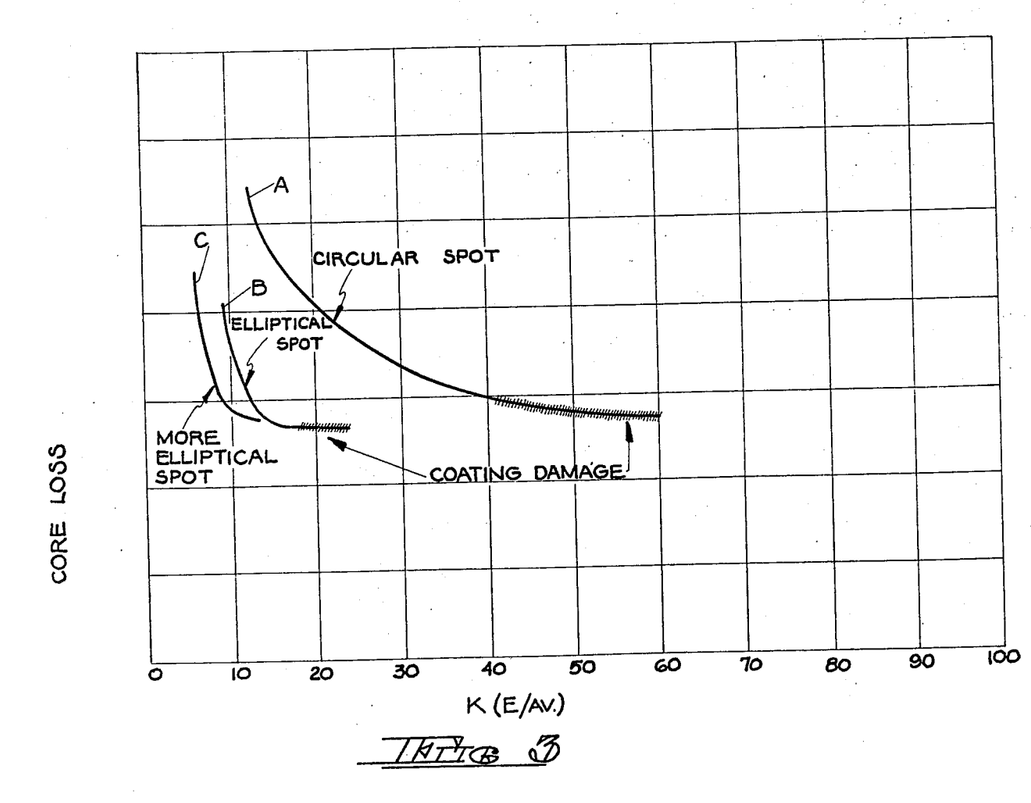
FIG. 3 is a graphical representation of core loss for various laser spot geometries using the present invention.

Curve A in FIG. 3 further illustrates the typical behavior of core loss for the type of grain oriented silicon steel described in FIG. 2 for a circular laser spot shape. As can be seen, the core loss decreases with increasing values of $E/A_v$. However, in the particular example illustrated for values of K $[E/A_v]$ greater than a criticial value of about 40, coating damage occurs. Consequently, to avoid coating damage, it has been found necessary to restrict K $[E/A_v]$ to values less than this critical value. This can be accomplished by proper selection of the laser power, scan time and dwell time in a specific laser implementation.

Figure 4A:
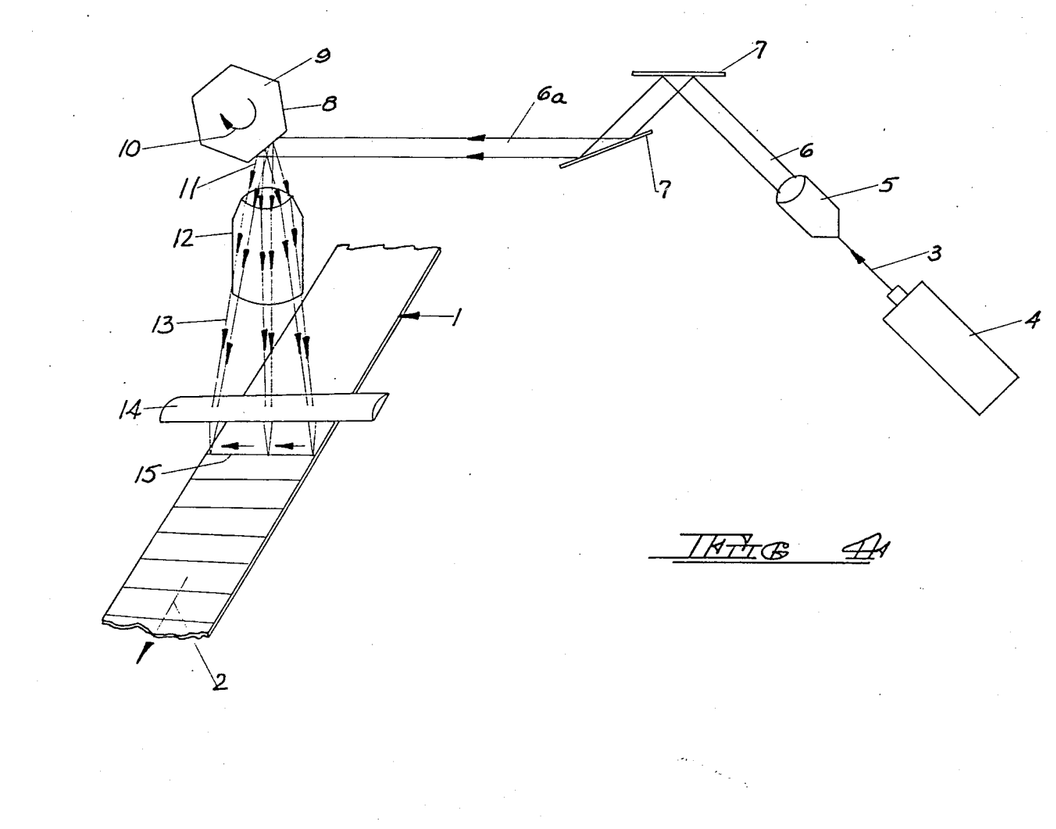
FIG. 4 is a diagrammatic schematic view of the optical scanning assembly of the present invention.

A preferred embodiment for optically scanning the laser beam across the width of a moving steel strip is illustrated in FIG. 4. A steel strip such as that described hereinabove is illustrated generally at 1. In a conventional routing, an indefinite length of strip 1 is moved in a straight line by means not shown in the direction of directional arrow 2 at a substantially constant speed.

A monochromatic relatively thin optical beam 3 is provided by a high power (e.g. 584 watt) continuous wave Nd:YAG laser 4. It will be understood, however, that other types of lasers such as Nd:glass, argon, alexandrite, $CO_2$, ruby, etc., producing a continuous wave beam of suitable irradiation energy, may also be utilized in connection with the present invention in order to produce the desired transmittance through the particular type of coating used, if any. Laser 4 may be located at any convenient position with respect to moving steel strip 1.

It is well known that the laser beam 3 emitted from the exit end of the laser transmitter exhibits a known divergence $\delta_o$, which varies as a function of beam power. In the present system divergence is reduced, and the beam width increased by passing beam 3 through an optical up collimator 5, which multiplies the beam width by some integral factor $M_c$ such as 2x, 3x, 7x, etc.

The collimated beam 6 may then be reflected off one or more planar directing mirrors 7 which serve only to control the beam direction. This permits the laser as well as the subsequent optical elements to be positioned beneath or along side of the moving steel strip 1 as appropriate in a particular installation.

The redirected collimated beam 6a impinges on one of the planar faces 8 of a polygonal mirror 9 rotating in the direction of arrow 10 at a speed producing the desired strip scan time, $t_{scan}$. In the exemplary embodiment, an eight faced mirror rotating at 605 RPM was used. However, it will be understood that the number of faces 8, the area of each face, as well as the rotational speed of mirror 9, will determine the effective scan time, $t_{scan}$, and affects the dwell time $\Delta t$ of the spot scanned across the width W of the moving steel strip. Furthermore, other types of scanning means or mechanisms such as an oscillating mirror, rotating prism, or acousto-optic deflector may be utilized.

The beam 11 reflected from the rotating mirror is passed through a large flat-field scanning lens 12 designed to give a uniformly focused spot over a relatively large flat field in the case of a substantially round spot shape. In the present example, the focal length f of the flat field lens 12 was selected to produce a twelve inch scan line at the surface of strip 1.

The beam 13 emerging from the flat field lens 12 may be focused directly on the surface of the steel strip to form a circular shaped spot of minimum size. The value of $E/A_v$ may be determined from the relationship described above and the particular parameters defining the optical components. For example, the dwell time $\Delta t$ can be expressed in terms of the spot diameter d as $\Delta t = d \, (t_{scan}/w)$. The spot diameter can be further defined as:

$$d = \frac{f \delta o}{M_c}$$

where f is the focal length of lens 12, $M_c$ is the multiplication factor of up collimator 5, and $\delta_o$ is the divergence of the beam at the exit of the laser, which will generally vary with laser output power. Combining these terms gives:

$$E/A_v = \frac{1}{2\sqrt{K}} \left[ \frac{M_c \, t_{scan}}{f W \delta o} \right]^{\frac{1}{2}} P$$

Consequently, the energy per unit vertical area at the strip can be related to laser power as described hereinabove.

In a laboratory run, a high permeability grain oriented strip, having an insulative coating of the type taught in the above mentioned U.S. Pat. Nos. 3,948,786 and 3,996,073, was laser treated according to the teachings of the present invention, utilizing a continuous wave Nd:YAG laser. A 10 cm. flat field lens system was used with the following conditions:

| | |
|---|---|
| Focal length of flat field lens (f) | = 10 cm. |
| Scan width | = 10 cm. |
| Up collimator multiplication factor ($M_c$) | = 3x |
| Effective scan time ($t_{scan}$) | = 10.8 µsec. |
| Dwell time ($\Delta t$) | = 13 µsec. |
| Line spacing (l) | = 8 mm. |
| Line speed | = 146 fpm. |
| Power (P) | = 100 w |
| Power per unit area (P/A) | $0.88 \frac{MW}{cm^2}$ |
| K [$E/A_v$] | = 30 |

The laser treated high permeability grain oriented strip had a permeability of 1903 and demonstrated no coating damage. Before the laser treatment, the strip had a core loss at 15 KG of 0.479 w/lb and a core loss at 17 KG of 0.686 w/lb. After the laser treatment the strip had a core loss at 15 KG of 0.450 w/lb (an improvement of 0.047 w/lb) and a core loss at 17 KG of 0.629 w/lb (an improvement of 0.057 w/lb).

It has been found that modifying the shape of the laser spot focused on the strip surface can also produce improvement in the treatment process. For example, the use of an elliptical-shaped spot having its long axis in the scan direction modifies the effective dwell time $\Delta t$, permitting a broader range of laser power values without damaging the insulative coating. In other words, the power per unit surface area (P/A) can be reduced. Consequently, significant improvement in core loss through domain refinement can be obtained with less danger of coating damage.

Typical reduction in core loss for an elliptical-shaped spot is shown in curve B of FIG. 3. As can be seen, the use of an elliptical spot permits reductions in core loss comparable to those obtainable with a circular-shaped spot, but at much lower values of $E/A_v$.

Further improvement can be obtained by use of an even more elliptical shaped spot, i.e. one which has a greater ratio of major to minor axis, as shown by curve C in FIG. 3. In this example, limitation on the output power of the laser used precluded measurement of values of K [E/A] *above a value of about* 13.

To produce an elliptical shaped spot, the beam 13 emerging from the flat field lens is passed through a large cylindrical lens 14 which is mounted with its long dimension oriented so that the lines 15 scanned on strip 1 are substantially perpendicular to the direction of strip travel. It will be understood that in some instances, the axis of cylindrical lens 14 may be skewed with respect to the direction of travel of the strip. It will be observed that in situations where the scan rate is large compared to the speed of strip travel, cylindrical lens 14 will be oriented substantially perpendicularly to the direction of strip travel. In the present invention, a four inch focal length cylindrical lens was used which served to narrow the width of the beam to about 0.2 mm at the surface of moving steel strip 1. It will be observed that the focusing of the scanning laser beam by cylindrical lens 14 produces a scan line 15 having the desired length, as well as reduces the width of the scan line in the direction of strip travel to increase the irradiant energy at the point of application to the strip surface.

It will be understood that various changes in the details, materials, steps and arrangements of parts, which have been herein described and illustrated to explain the nature of the invention may be made herein within the scope and principle of the invention as expressed in the appended claims. For example, as indicated above, the teachings of the present invention are not limited to the laser treatment of regular grain oriented silicon steel or high permeability grain oriented silicon steel. The invention can be applied to any magnetic material having domains of such size that refinement thereof would result in significant core loss improvement.

In addition, prior art workers have devised methods of producing low core loss amorphous magnetic materials utilizing special manufacturing techniques and a subsequent anneal in a magnetic field. The low core loss of this amorphous material is attributable to its inherently thin gauge, high volume resistivity and controlled composition. Nevertheless, amorphous materials are handicapped since they have no crystalline defects such as grain boundaries, dislocations, or subgrain boundaries which are known to reduce the size of magnetic domains in crystalline materials such as oriented silicon steels. As a result the magnetic domains in amorphous materials are large and thus prevent attainment of the lowest possible core losses.

According to the present invention, the amorphous material, as-cast, may be coated with a thin insulative coating. Thereafter, it is laser treated in accordance with the present invention, built into a core or the like and annealed in a magnetic field. The domain refinement as a result of the laser treatment will be stable during such an anneal.

During the laser treatment the amorphous material is irradiated at or nearly transverse to the magnetizing direction (normally the spin-casting direction of the strip if so manufactured). The laser beam induces an array of defects which serve to nucleate new domain walls. The resultant domain walls of smaller spacing in the amorphous sheet material will reduce core loss under the application of AC magnetic fields.

Furthermore, the scanning assembly of the present invention may be used for other types of laser material treatment or processing applications to effect some type of beneficial change in the material such as welding, alloying, heat treating, drilling, cutting, scribing, surface cladding, etc.

The embodiments of the invention in which an exclusive property or privilege is claimed are as follows:

1. In apparatus for the continuous manufacturing of an indefinite length strip of magnetic material of the type having a plurality of magnetic domains and an insulative coating thereon, said strip moving at a substantially constant speed, the improvement in combination therewith comprising a laser producing a laser beam, and means for focusing said beam onto the surface of the moving strip so as to produce in the strip a narrow line of subdivided magnetic domains without damage to the insulative coating.

2. The apparatus according to claim 1 wherein said beam produces at the strip a value of energy per unit vertical area sufficient to cause domain refinement but less than that sufficient to damage the coating.

3. The apparatus according to claim 2 including means for scanning said beam across the width of the strip to produce a plurality of spaced lines of subdivided magnetic domains.

4. The apparatus according to claim 3 wherein said scanning means comprises a multiple faced rotating mirror.

5. The apparatus according to claim 3 wherein said laser produces at said strip an effective dwell time of from about 0.001 to 10 msec.

6. The apparatus according to claim 3 wherein said spaced lines are substantially perpendicular to the direction of strip travel.

7. The apparatus according to claim 6 wherein the spacing of said lines is at least about 2.0 mm.

8. The apparatus according to claim 3 wherein said scanning means comprises a multiple-faced rotating mirror.

9. The apparatus according to claim 2 wherein said laser comprises a continuous wave laser.

10. The apparatus according to claim 9 wherein said laser comprises a Nd:YAG laser.

11. The apparatus according to claim 3 wherein said laser comprises a continuous wave Nd:YAG laser.

12. The apparatus according to claim 11 wherein said focusing means comprises means for modifying said beam to produce on the material surface an elongated elliptical spot.

13. The apparatus according to claim 12 wherein said beam modifying means comprises a cylindrical lens and an optical up-collimator.

14. The apparatus according to claim 13 including a flat field lens positioned between said up-collimator and said cylindrical lens.

15. The apparatus according to claim 14 wherein said scanning means comprises a multiple-faced rotating mirror.

16. A method of laser treating as indefinite length strip of magnetic material of the type having a plurality of magnetic domains and an insulative coating thereon comprising moving the strip at a predetermined substantially constant speed in a predetermined direction and repetitively and continuously scanning a laser beam across the width of the moving strip transversely of said predetermined direction so as to produce on the surface of the strip a plurality of narrow lines of subdivided magnetic domains spaced in the direction of strip travel without damage to the insulative coating.

17. The method according to claim 16 including the step of shaping the laser beam so as to produce on the material surface an elongated spot having its long dimension in the scan direction.

18. The method according to claim 17 including the step of shaping the laser beam to produce an elliptical-shaped spot on the material surface.

19. The method according to claim 16 wherein the laser beam produces on the surface of the material an elongated spot having its long dimension in the scan direction.

20. The method according to claim 19 including the step of shaping the laser beam to produce an elliptical-shaped spot on the material surface.

* * * * *